US008799765B1

(12) United States Patent
MacInnis et al.

(10) Patent No.: US 8,799,765 B1
(45) Date of Patent: Aug. 5, 2014

(54) SYSTEMS FOR SHARING ANNOTATIONS AND LOCATION REFERENCES FOR SAME FOR DISPLAYING THE ANNOTATIONS IN CONTEXT WITH AN ELECTRONIC DOCUMENT

(75) Inventors: Charles M. MacInnis, San Francisco, CA (US); Joshua John Forman, San Francisco, CA (US); Anne K Halsall, San Francisco, CA (US); Scott William Kyle, El Dorado Hills, CA (US); Robert Cromwell, Seattle, WA (US); Kevin Ballard, San Francisco, CA (US); Peter S. Cho, San Francisco, CA (US)

(73) Assignee: Inkling Systems, Inc., San Francisco, CA (US)

( * ) Notice: Subject to any disclaimer, the term of this patent is extended or adjusted under 35 U.S.C. 154(b) by 214 days.

(21) Appl. No.: 12/731,656

(22) Filed: Mar. 25, 2010

Related U.S. Application Data

(60) Provisional application No. 61/300,319, filed on Feb. 1, 2010.

(51) Int. Cl.
*G06F 17/00* (2006.01)
*G06F 17/24* (2006.01)

(52) U.S. Cl.
USPC ............ 715/230; 715/232; 715/233; 715/253

(58) Field of Classification Search
CPC .............. G06F 17/241; G06F 17/3089; G06F 17/30058; G06F 17/30525; G06Q 30/06; G06Q 30/0601
USPC ................................. 715/230, 232, 233, 229
See application file for complete search history.

(56) References Cited

U.S. PATENT DOCUMENTS

| 7,747,943 B2 * | 6/2010 | Bargeron et al. ............. 715/235 |
| 7,818,679 B2 * | 10/2010 | Clarke .......................... 715/751 |
| 2003/0065642 A1 * | 4/2003 | Zee ..................................... 707/1 |
| 2005/0091027 A1 * | 4/2005 | Zaher et al. ..................... 703/22 |
| 2005/0132281 A1 * | 6/2005 | Pan et al. ....................... 715/515 |
| 2005/0160356 A1 * | 7/2005 | Albornoz et al. ............. 715/512 |
| 2007/0118794 A1 * | 5/2007 | Hollander et al. ............ 715/512 |
| 2008/0168073 A1 * | 7/2008 | Siegel et al. ................... 707/100 |
| 2009/0220216 A1 * | 9/2009 | Marsh et al. .................. 386/124 |
| 2010/0278453 A1 * | 11/2010 | King ............................. 382/321 |
| 2011/0179385 A1 * | 7/2011 | Li et al. ......................... 715/810 |

OTHER PUBLICATIONS

Brian Barrett, "The Copia eBook Platform and Hardware Get Social With eReading," Jan. 6, 2010, gizmodo.com, pp. 1-4.*
Frederic Lardinois, "Copia Challenges Amazon, B&N and Sony: Unveils New E-Book Platform and 6 E-Readers," Jan. 6, 2010, readwrite.com, pp. 1-3.*
Jane Litte, "Software EBook Highlights from CES 2010," Jan. 10, 2010, dearauthor.com, pp. 1-8.*

(Continued)

*Primary Examiner* — Doug Hutton, Jr.
*Assistant Examiner* — Ariel Mercado
(74) *Attorney, Agent, or Firm* — Ascenda Law Group, PC

(57) ABSTRACT

In one embodiment, a user of a first portable digital computing device creates an annotation associated with a particular reading location within a reference document. The annotation and the reading location are shared with a second portable digital computing device storing a copy of the reference document. Using the shared information, the second device displays the reference document with the annotation shown at the reading location.

20 Claims, 13 Drawing Sheets

(56) References Cited

OTHER PUBLICATIONS

Empson, R., "Build and Share Rich Educational Content With Desmos", [retrieved on Mar. 7, 2012]. Retrieved from the Internet: <URL: http://techcrunch.com/2011/05/24/build-and-share-rich-educational-content-with-desmos/ >, (May 24, 2011), 1 pg.

Once Upon a Time Productions, LLC, "Advanced Calculations", online video presented at TutorTrove.com, [retrieved on Feb. 24, 2012]. Retrieved from the Internet: <URL: https://tutor-trove.tenderapp.com/kb/welcome-to-tutor-trove/whitebaord-video-tutorials-equations-graphing>, .avi file (10,692 KB), 1 min. 50 sec. (Feb. 2011).

Reed College, Web page describing biology software entitled "PopBio", [retrieved on May 24, 2011]. Retrieved from the Internet: <URL: http://academic.reed.edu/biology/software.html>, p. 1 (2008).

Desmos, Inc., "Desmos Startup Battlefield Presentation", online video presented at Techcrunch.com, [retrieved on Feb. 24, 2012]. Retrieved from the Internet: <URL: http:I/techcrunch.com/2011/05/24/build-and-share-rich-educational-content-with-desmos/>, .avi file (584,866 KB), 9 min., 40 sec. (May 24, 2011).

Desmos, Inc., "About Us", [retrieved on Aug. 3, 2011]. Retrieved from the Internet: <URL: http://www.desmos.com/about >, p. 1 (publication date unknown).

Desmos, Inc., "Blog", [retrieved on Aug. 3, 2011]. Retrieved from the Internet: <URL: http://blog.desmos.com >, pp. 1-6 (Jul.-Aug. 2011).

Desmos, Inc., "Frequently Asked Questions", [retrieved on Aug. 3, 2011]. Retrieved from the Internet: <URL: www.desmos.com/faqs >, pp. 1-2 (2011).

Once Upon a Time Productions, LLC, "Fall Improvements Part 2", [retrieved on Feb. 24, 2012]. Retrieved from the Internet: <URL: https://tutor-trove.tenderapp.com/kb/version-updates/fall-tweaks-part-2>, pp. 1-9 (Oct. 2010).

Once Upon a Time Productions, LLC, "Fall Tweaks Part 1", [retrieved on Feb. 24, 2012]. Retrieved from the Internet: <URL: https://tutor-trove.tenderapp.com/kb/version-updates/fall-tweaks-part-1-september-14-2010>, pp. 1-11 (Sep. 2010).

Once Upon a Time Productions, LLC, "Graphs", online video presented at TutorTrove.com [retrieved on Feb. 24, 2012). Retrieved from the Internet: <URL: https://tutor-trove.tenderapp.com/kb/welcome-to-tutor-trove/whiteboard-video-tutorials-equations-graphing>, .avi file (10,439 KB) 1 min. 44 sec. (Feb. 2011).

Stylishly Bookish, "Kindle Now Sharing Your Highlights", [retrieved on Aug. 18, 2011]. Retrieved from the Internet: <URL: http://stylishlybookish.wordpress.com/2010/05/05/kindle-now-sharing-your-highlights/>, pp. 1-4 (May 5, 2010).

Bonnier AB, "Mag+", online video presented at vimeo.com [retrieved on Feb. 24, 2012]. Retrieved from the Internet: <URL: http://vimeo.com/8217311>, .mp4 file (610,247 KB), 8 min., 4 sec. (2010). The video illustrates one possible vision for digital magazines.

Bonnier AB, "Mag+", [retrieved on Feb. 24, 2012). Retrieved from the Internet: <URL: http://vimeo.com/8217311>, pp. 1-17 (2010). Web page and comments describing video content.

Desmos, Inc., "Math Geeks, Rejoice! The Desmos Graphing Calculator Is Here, It's Online and It's Free", online video presented at techcrunch.com [retrieved on Aug. 3, 2011]. Retrieved from the Internet: <URL: http://techcrunch.com/2011/06/24/desmos-graphing-calculator/>, .avi file (57,656 KB) 1 min. 8 sec. (Jun. 24, 2011).

Techcrunch.com, "Math Geeks, Rejoice! The Desmos Graphing Calculator Is Here, It's Online and It's Free", [retrieved on Aug. 3, 2011]. Retrieved from the Internet: <URL: http://techcrunch.com/2011/06/24/desmos-graphing-calculator/>, p. 1 (Jun. 24, 2011). Web page describing video presentation.

Once Upon a Time Productions, LLC, "Online Tutoring", [retrieved on Feb. 24, 2012]. Retrieved from the Internet: <URL: http://www.tutortrove.com/services.php>, p. 1 (2011).

"Orbit3d for Mac", Version: 1.0, online software available at download.cnet.com are related web pages, [retrieved on Aug. 10, 2011]. Retrieved from the Internet: <URL: http://download.cnet.com/Orbit3d/3000-2054_4-10071019.html>, pp. 1-8 (Mar. 24, 2003).

Once Upon a Time Productions, LLC, "Plotting Points", online video presented at TutorTrove.com [retrieved on Feb. 24, 2012]. Retrieved from the Internet: <URL: https://tutor-trove.tenderapp.com/kb/welcome-to-tutortrove/whiteboard-video-tutorials-equations-graphing>, .avi file (17,795 KB), 2 min. 54 sec. (Feb. 2011).

Greene, Araby, "Share Kindle Hightlights on Facebook", blog posting at webbishbooks.com [retrieved on Aug. 18, 2011]. Retrieved from the Internet: <URL: http://webbishbooks.com/201 0/09/share-kindle-highlights-on-facebook >, pp. 1-2 (Sep. 9, 2010).

Once Upon a Time Productions, LLC, "Simplified Scheduling", [retrieved on Feb. 24, 2012]. Retrieved from the Internet: <URL: http://www.tutortrove.com/services.php>, p. 1 (2011).

Once Upon a Time Productions, LLC, "Student Tutorial", online video presented at TutorTrove.com [retrieved on Feb. 24, 2012]. Retrieved from the Internet: <URL: https://tutor-trove.tenderapp.com/kb/welcome-to-tutortrove/student-tutorial>, .avi file (6,805 KB), 58 sec. (2011).

Once Upon a Time Productions, LLC, "Student Tutorial", [retrieved on Feb. 24, 2012]. Retrieved from the Internet: <URL: https://tutor-trove.tenderapp.com/kb/welcome-to-tutor-trove/student-tutorial>, pp. 1-4 (Mar. 4, 2011).

Wolfram Research, Inc., "Tangent to a Curve", [retrieved on May 24, 2011]. Retrieved from the Internet: <URL: http://demonstrations.wolfram.com/TangentToACurve/>, pp. 1-2 (2009).

Once Upon a Time Productions, LLC "The Basics for Tutors", [retrieved on Feb. 24, 2012]. Retrieved from the Internet: <URL: https://tutor-trove.tenderapp.com/kb/getting-started/the-basics-for-tutors?sso=>, pp. 1-7 (2011).

Once Upon a Time Productions, LLC, "Tutor Trove Feature Demo", online video prsented at TutorTrove.com, 2011 [retrieved on Feb. 24, 2012]. Retrieved from the Internet: <URL: http://www.tutortrove.com/popup_video.php?id=3>, .avi file (42,255 KB), 2min., 15 sec. (2011).

Once Upon a Time Productions, LLC, "Tutor Trove Feature Demo", [retrieved on Mar. 7, 2012]. Retrieved from the Internet: <URL: http://www.tutortrove.com/popup video.php?id=3 >, p. 1 (2011).

Once Upon a Time Productions, LLC, "Manage Your Users", [retrieved on Feb. 24, 2012]. Retrieved from the Internet: <URL: http://www.tutortrove.com/services.php>, p. 1 (2011).

Once Upon a Time Productions, LLC, "Tutor Trove Support: About Users", [retrieved on Aug. 3, 2011]. Retrieved from the Internet: <URL: https://tutor-trove.tenderapp.com/kb/users/about-users>, pp. 1-4 (2011).

Once Upon a Time Productions, LLC, "Tutor Trove Support: Equations", [retrieved on Feb. 24, 2012]. Retrieved from the Internet: <URL: https://tutor-trove.tenderapp.com/kb/the-whiteboard/equations >, pp. 1-8 (2011).

Once Upon a Time Productions, LLC, "Tutor Trove Support: Graphing", [retrieved on Aug. 3, 2011]. Retrieved from the Internet: <URL: https://tutor-trove.tenderapp.com/kb/the-whiteboard/graphing >, pp. 1-4 (2011).

Once Upon a Time Productions, LLC, "Tutor Trove Support: Navigating the Whiteboard", [retrieved on Feb. 24, 2012]. Retrieved from the Internet: <URL: https://tutor-trove.tenderapp.com/kb/the-whiteboard/navigating-the-whiteboard>, pp. 1-7 (2011).

Once Upon a Time Productions, LLC, "Tutor Trove Support: Scheduling Sessions", [retrieved on Aug. 3, 2011]. Retrieved from the Internet <URL: https://tutor-trove.tenderapp.com/kb/sessions/scheduling-sessions >, pp. 1-5 (2011).

Once Upon a Time Productions, LLC, "Tutor Trove Support: Tutoring Services", [retrieved on Aug. 3, 2011]. Retrieved from the Internet: <URL: https://tutor-trove.tenderapp.com/kb/services-locations/tutoring-services>, pp. 1-6 (2011).

Once Upon a Time Productions, LLC, "Tutor Trove Support: Your Menu", [retrieved on Aug. 3, 2011]. Retrieved from the Internet: <URL: https://tutor-trove.tenderapp.com/kb/navigating-your-tutortrove-site/your-menu>, pp. 1-6 (2011).

Once Upon a Time Productions, LLC, "Tutor Trove: Testimonials", [retrieved on Aug. 3, 2011]. Retrieved from the Internet: <URL: http://www.tutortrove.com/testimonials.php >, pp. 1-2 (2011).

(56) References Cited

OTHER PUBLICATIONS

Once Upon a Time Productions, LLC, "Version Update Feb. 21, 2011!", [retrieved on Feb. 24, 2012]. Retrieved from the Internet: <URL: https://tutor-trove.tenderapp.com/kb/version-update-february-21-2011>, pp. 1-9 (Feb. 2011).

Once Upon a Time Productions, LLC, "Whiteboard Video Tutorials—Equations & Graphing", [retrieved on Aug. 3, 2011]. Retrieved from the Internet: <URL: https://tutor-trove.tenderapp.com/kb/welcome-to-tutor-trove/whiteboard-video-tutorials-equations-graphing?sso>, pp. 1-10 (2011).

Once Upon a Time Productions, LLC, "Whiteboard Video Tutorials—Files & Images", [retrieved on Aug. 3, 2011]. Retrieved from the Internet: <URL: https://tutor-trove.tenderapp.com/kb/welcome-to-tutor-trove/whiteboard-video-tutorials-files-images>, pp. 1-6 (2011).

Once Upon a Time Productions, LLC, "Whiteboard Video Tutorials—Manipulating Shapes", [retrieved on Aug. 3, 2011]. Retrieved from the Internet: <URL: https://tutor-trove.tenderapp.com/kb/welcome-to-tutortrove/whiteboard-video-tutorials-manipulating-shapes>, pp. 1-8 (2011).

Boog, J., "How to Copy, Paste & Share Your Kindle Highlights", [retrieved on Aug. 18, 2011]. Retrieved from the Internet: <URL: http://www.mediabistro.com/galleycat/how-to-copy-paste-your-kindle-highlights_b22950>, pp. 1-4 (Aug. 5, 2011).

Freeman, D., "Kindle Notes and Highlights Now Accessible on the Web", [retrieved on Aug. 18, 2011]. Retrieved from The Internet: <URL: http://techcrunch.com/2009/05/26/kindle-notes-and-highlights-now-accessible-on-the-web/>, pp. 1-2 (May 26, 2009).

Golden, A., "Orbit3D", online user guide posted at sourcforge.net [retrieved on Aug. 19, 2011]. Retrieved from the Internet: <URL: http://orbit3d.sourceforge.net/>, pp. 1-15 (2002).

Reid, Calvin, "Book Country Launches Self-Publishing Services", [retrieved on Nov. 18, 2011]. Retrieved from Internet: <http://www.publishersweekly.com/pw/by-topic/industry-news/publisher-news/article/49523-book-country-launches-self-publishing-services.html>, pp. 1-4 (Nov. 16, 2011).

\* cited by examiner limited by the shortest wavelength of light used to Illuminate the specimen. Light microscopes can magnify effectively to about 1,00 tiems the actual size of the specimen; at a greater magnifications, additional details cannot be seen clearly. A third important parameter in microscopy is contrast, which accentuates differences in parts of the sample. In fact, most improvements in light microscopy in the last hundred years have involved new methods for enhancing contrast, such as staining or labeling cell components to sand out visually (Figure 6.3).

Figure 6.2 The size range of cells.

GRAPHICAL IMAGE

Cell walls were first seen by Robert Hooke in 1665 as he looked through a microscope at dead cells from the bark of an oak tree. But it took the wonderfully crafted lenses of Antoni van Leeuwenhoek to visualize living cells. Imagine Hooke's awe when he visited Van Leeuwenhoek in 1674 and the world of microorganisms- host called "very these early observations Figure 6.3
RESEARCH METHOD
Light Microscopy

Copy    Highlight    Add note

Most subcellular structures-including organelles, which are membrane-enclosed compartments-are simply too small to be resolved by the light microscope.

Cell biology advanced rapidly in the 1950s with the introduction of the electron microscope. Instead of using light, the electron microscope (EM) focuses a beam of electrons through the specimen or onto its surface (see Appendix D). Resolution is inversely related to the wavelength of the radiation a microscope uses for imagine, and electron home have much shorter wavelengths than visible light. Modern

*FIG 6A* wonderfully crafted lenses of
Antoni van Leeuwenhoek to
visualize living cells. Imagine
Hooke's awe when he visited
Van Leeuwenhoek in 1674 and
the world of of
microorganisms-what his

GRAPHICAL IMAGE

Figure 6.3
RESEARCH METHOD
Light Microscopy host called "very little animalcules"-was revealed to him. In spite of
these early observations, the cells geography remained largely
635 uncharted for some time. Most subcellular structures-including
organelles, which are membrane-enclosed compartments-are simply
too small to be resolved by the light microscope.

Cell biology advanced rapidly in the 1950s with the introduction of
the electron microscope. Instead of using light, the **electron
microscope (EM)** focuses a beam of electrons through the specimen or
onto its surface (see Appendix D). Resolution is inversely related to the
wavelength of the radiation a microscope uses for imaging, and electron
beams have much shorter wavelengths than visible light. Modern
electron microscopes can theoretically achieve a resolution of about
0.002 nm, although for practical purposes they usually cannot resolve
biological structures smaller than about 2 nm. Still, this resolution is a
hundredfold improvement over the light microscope. The term cell
ultrastructure refers to the cellular anatomy revealed by an electron
Microscope.

600

The scanning electron microscope (SEM) is especially useful for
detailed study of the surface of a specimen (Figure 6.4a). The electron
beam scans the surface of the
sample, which is usually coated with a thin film of gold. The
beam excites electrons on the
Surface, and these secodnary
electrons are detected by a
device that translates the
pattern of electrons into an
electronic signal to a video
screen. The result is an image
of the specimen's topography.
The SEM has great depth of

GRAPHICAL IMAGE

*FIG 6C* wonderfully crafted lenses of
Antoni van Leeuwenhoek to
visualize living cells. Imagine
Hooke's awe when he visited
Van Leeuwenhoek in 1674 and

GRAPHICAL IMAGE

RESEARCH METHOD t Microscopy

History of animalcules is interesting. Why
did it take so long to discover organelles?

evealed to him. In spite of
these early observations, the cells geography remained largely
uncharted for some time. Most subcellular structures-including
organelles, which are membrane-enclosed compartments-are simply
too small to be resolved by the light microscope.

Cell biology advanced rapidly in the 1950s with the introduction of
the electron microscope. Instead of using light, the **electron
microscope (EM)** focuses a beam of electrons through the specimen or
onto its surface (see Appendix D). Resolution is inversely related to the
wavelength of the radiation a microscope uses for imaging, and electron
beams have much shorter wavelengths than visible light. Modern
electron microscopes can theoretically achieve a resolution of about
0.002 nm, although for practical purposes they usually cannot resolve
biological structures smaller than about 2 nm. Still, this resolution is a
hundredfold improvement over the light microscope. The term cell
ultrastructure refers to the cellular anatomy revealed by an electron
Microscope.

The scanning electron microscope (SEM) is especially useful for
detailed study of the surface of a specimen (Figure 6.4a). The electron
beam scans the surface of the
sample, which is usually coated with a thin film of gold. The
beam excites electrons on the
Surface, and these secodnary
electrons are detected by a
device that translates the
pattern of electrons into an
electronic signal to a video
screen. The result is an image
of the specimen's topography.
The SEM has great depth of

GRAPHICAL IMAGE

FIG 6D wonderfully crafted lenses of
Antoni van Leeuwenhoek to
visualize living cells. Imagine
Hooke's awe when he visited
Van Leeuwenhoek in 1674 and
the world of
microoranisms-what his
host called "very little animalcules"-was revealed to him. In spite of
these early observations the cell's geography remained largely
uncharted for some time. Most subcellular structures-including
Organelles, which are membrane-enclosed compartments-are simply
too small to be resolved by the light microscope.

Cell biology advanced rapidly in the 1950s with the introduction of
the electron microscope. Instead of using light, the electron
microscope (EM) focuses a beam of electrons through the specimen or
onto its surface (see Appendix D). Resolution is inversely related to the
wavelength of the radiation a microscope uses for imagine, and electron
home have much shorter wavelengths than visible light. Modern

GRAPHICAL
IMAGE

Figure 6.3
RESEARCH METHOD
Light Microscopy

| Delete | Edit note | Done |

History of animalcules is interesting. Why did it take so long to discover organelles?

| Q | W | E | R | T | Y | U | I | O | P |
| A | S | D | F | G | H | J | K | L |
| ⇧ | Z | X | C | V | B | N | M | ⌫ |
| 123 | space | return |

FIG 6E

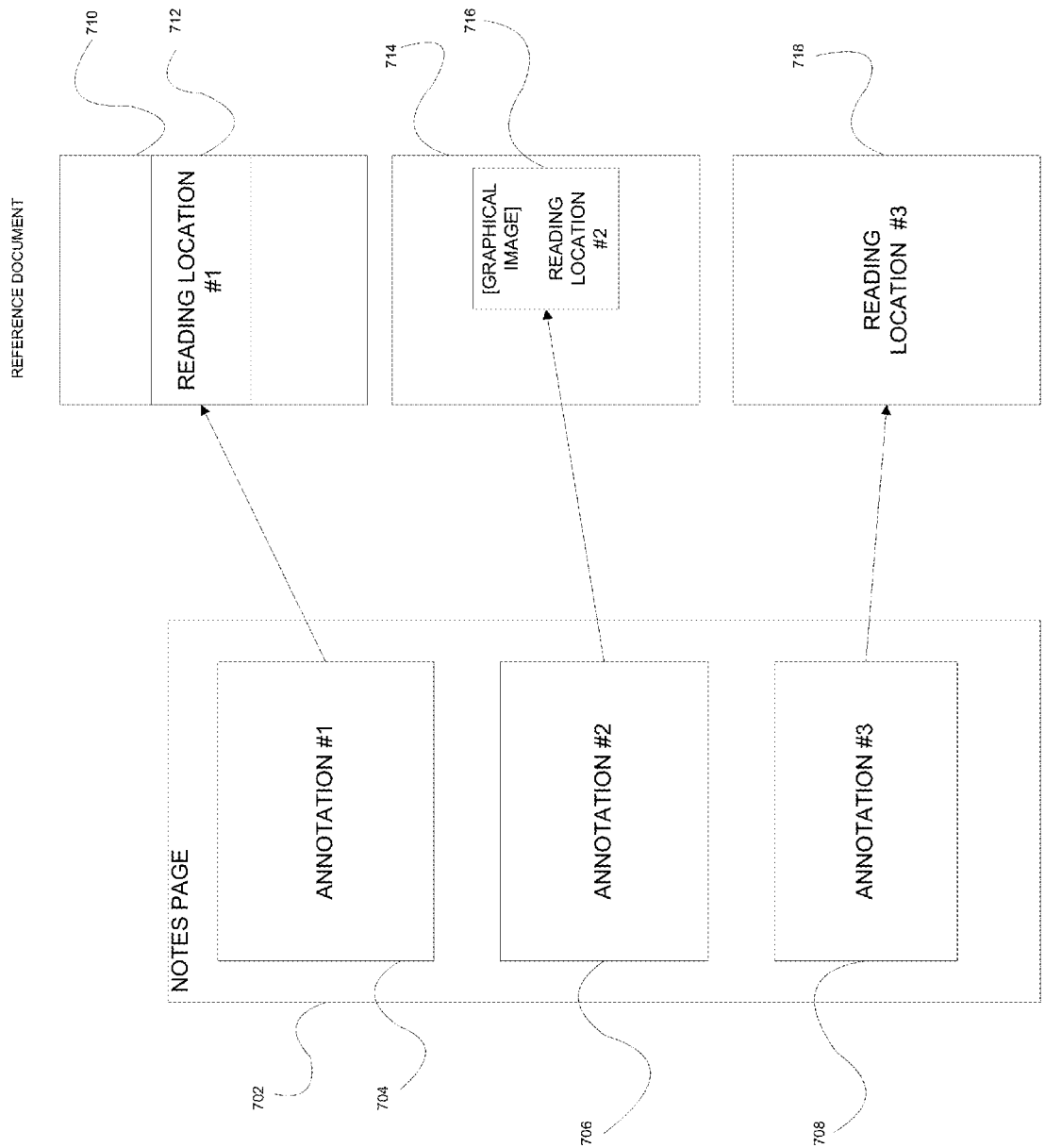

ately to sharing one or more
reading locations in a reference document and displaying the
one or more reading locations on an electronic computing
device.

SYSTEMS FOR SHARING ANNOTATIONS AND LOCATION REFERENCES FOR SAME FOR DISPLAYING THE ANNOTATIONS IN CONTEXT WITH AN ELECTRONIC DOCUMENT

CROSS REFERENCE TO RELATED APPLICATION

This application is related to U.S. Provisional Application No. 61/300,319, filed on Feb. 1, 2010, and claims priority thereto.

FIELD OF THE INVENTION

This invention relates generally to sharing one or more reading locations in a reference document and displaying the one or more reading locations on an electronic computing device.

BACKGROUND

As the use of personal computing devices to read and view content becomes more commonplace, there is growing need for users to be able to communicate and share ideas, notes or other information related to such content. Communicating such information is most commonly communicated out of context of the content or with insufficient context. Other communications methods require transmitting such information and a copy of the content which can unduly burden computing and network resources and complicate the communication of subsequent information. Moreover, traditional communications methods are incapable of handling context-specific information received from more than one source, particularly if such information is related to more than one location in the content. Thus, there exists a need in the art to efficiently and effectively share context-specific information amongst users with reference to locations within the content to which such information relates.

SUMMARY OF THE INVENTION

The embodiments disclosed herein relate generally to sharing one or more reading locations in a reference document and displaying the one or more reading locations on an electronic computing device.

In one embodiment of the invention, a portable digital computing device for viewing shared annotations of at least one electronic reference document comprises a digital memory, a display, a user input interface, and a network interface; and said computing device is configured to store a persistent copy of the reference document locally in the digital memory; receive, via the network interface, an electronic transmission over a telecommunications network of a digital location identifier and an associated annotation, said identifier specifying the reference document and a reading location within the document; and responsive to a user request, display the persistent local copy of the document, with the annotation automatically shown at the specified reading location, on the display.

In another embodiment of the invention, a portable digital computing device for transmitting shared annotations of at least one electronic reference document comprises a digital memory, a display, a user input interface, and a network interface; and said computing device is configured to: store a persistent copy of the reference document locally in the digital memory; receive, via the user input interface, information corresponding to a reading location within the reference document and an associated annotation; and transmit, via the network interface, an electronic transmission over a telecommunications network of a digital location identifier and the associated annotation, said identifier specifying the reference document and the reading location within the document.

For purposes of summarizing this invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 6A-E illustrate an example application of an embodiment of the invention for use by a student in an educational course.

FIGS. 7A-C illustrate another example application of an embodiment of the invention for use by a student in an educational course.

DETAILED DESCRIPTION OF PREFERRED EMBODIMENTS

Figure 1:
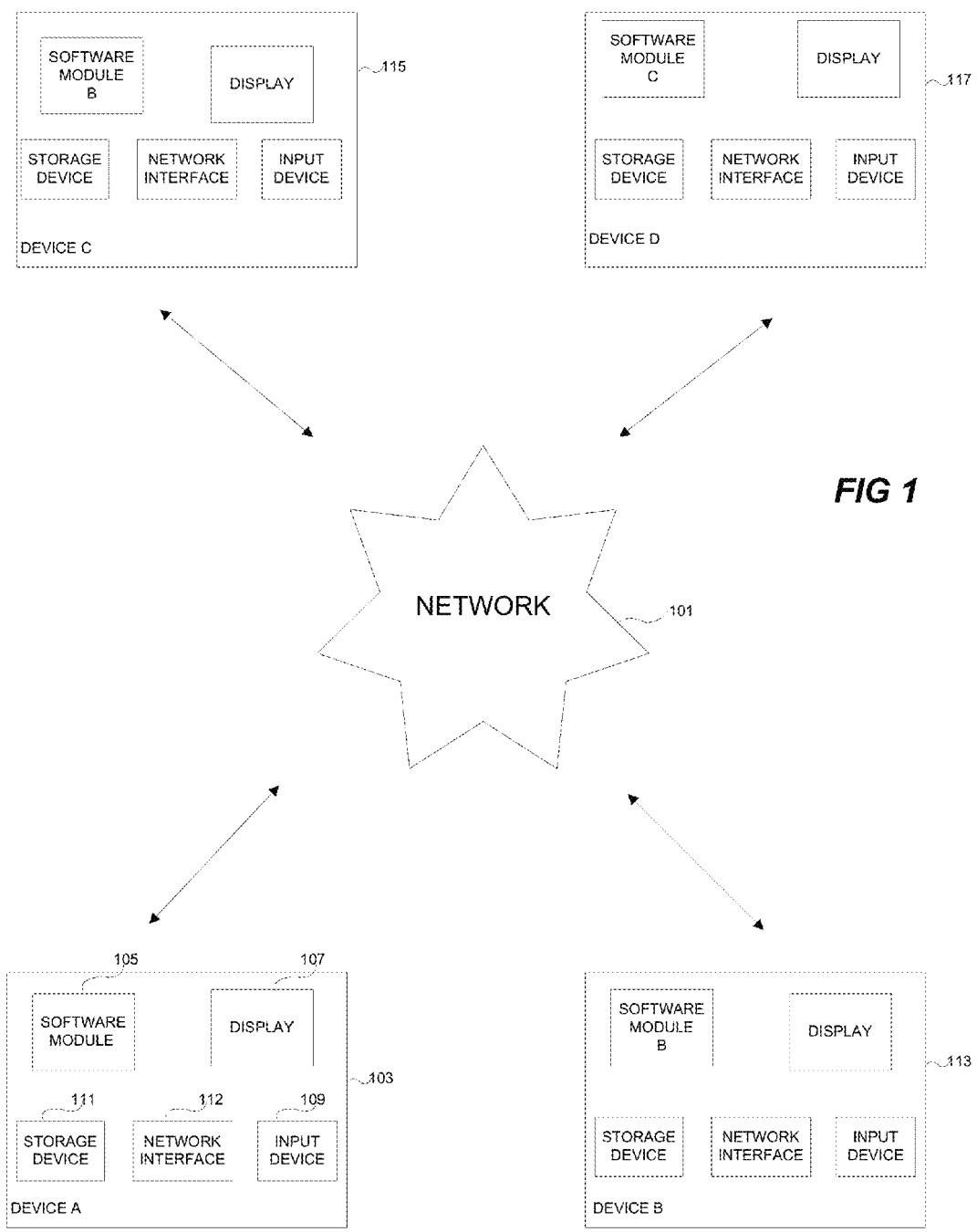
FIG. 1 illustrates one embodiment of a high-level system diagram of connections of electronic devices in one embodiment of the present invention.

Systems, methods, processes, data structures and user interfaces which represent one embodiment of the invention will now be described with reference to the drawings. Variations to the systems, methods, processes, data structures and user interfaces will also be described.

I. Overview

In one embodiment, an electronic computing device is in communication with a plurality of other electronic devices over a network. The electronic computing device stores a copy of a reference document that is output to the display of the electronic computing device. A user of the electronic computing device is able to navigate the reference document, select a reading location and transmit a computer-readable location identifier to one of the other electronic devices connected to the network without transmitting the reference document.

As used herein, the term reference document refers to an electronic or computer-readable document comprising text, images, tables, interactive objects, quizzes and/or assessments. For example, reference documents may include an electronic version of a magazine, article, newspaper, presentation, book, 3-D object collection, video anthology or textbook. In some embodiments, the reference document may be protected using digital rights management (DRM) technology. DRM technology typically disables the illegal copying and distribution of copyrighted works.

The term reading location refers to any discrete location or set of discrete locations located in the reference document. For example, reading locations may include a word, a plurality of words, a title, a sentence, a paragraph, a chapter, a section, an image, a table, an interactive object, a specific question in an interactive assessment set, a frame or frames in a video or any portion of the foregoing.

In some implementations, the user may also enter an annotation corresponding to the reading location which is transmitted as part of the computer-readable location identifier. For example, annotations may include one or more words, one or more numerals, a mathematical formula, a graphical image, a link to a location, a universal resource locator (URL) address, a script and highlighting of selected text.

When another electronic device on the network receives the computer-readable location identifier, the receiving electronic device outputs to its display the reading location. In some embodiments, the reading location may be displayed in the context of a copy of the reference document stored on the receiving electronic device or in the context of only an excerpt of the reference document. If an annotation is transmitted in connection with the location identifier, it is also contemplated that the receiving electronic device could be configured to display the annotation at or near of the reading location.

The electronic computing device may also be configured to receive a plurality of annotations from one or more of the electronic devices connected to the network. In one embodiment, the plurality of annotations are displayed in the context of the reference document at or near each annotation's reading location. In another embodiment, some or all of the plurality of annotations are displayed in a notes page. In some implementations, a user can navigate to the reading location corresponding to an annotation by selecting the annotation in the notes page.

The embodiments described herein may be advantageously utilized in a variety of environments. For example, embodiments of the invention may be used in an academic classroom to permit students to collaborate and share notes on reading assignments and to allow educators to direct students to particular portions of a text. Additionally, students in a large lecture class may follow the note stream of the professor, seeing his or her annotations in line with the student's own. Students may also view a "heat map" of the document (for example, a textbook) that identifies which text has been most commonly annotated or highlighted, giving the user a sense of which parts of the document are most important or interesting to users in the class, or users of the document globally. In another example, users in a study group follow the notes of others in the group in order to direct attention to topics of interest to the group. In yet another example, students in a particular lecture "section" in a university setting are able to follow the notes of the teaching assistant in charge of the section and note his or her comments prior to face-to-face meetings with the teaching assistant.

Examples of enterprise applications for embodiments of the present invention are also numerous and may include directed navigation through a presentation to attendees who are remotely located from the presenter and transmitting comments in real-time to multiple recipients of a document. Additional possible applications include permitting Internet users to make reading location-specific comments to on-line articles, sharing comments amongst users of a book club and reducing bandwidth and storage requirements on networks by enabling document collaborators to transmit comments using light-weight location identifiers rather than multiple copies of the underlying reference document.

II. System Architecture

FIG. 1 illustrates one embodiment of a high-level system diagram of connections of electronic devices in one embodiment of the present invention. In FIG. 1, a plurality of devices 103, 113, 115, 117 are connected to a network 101.

In one embodiment, the plurality of devices 103, 113, 115, 117 may be one of the following types: a mobile device, a portable electronic computing device, a cellular phone, a personal digital assistant (PDA), an e-book reader, a laptop, a netbook, a tablet computer, a mainframe terminal, a client application, a web browser, a desktop computer, an iPad, an iPod, an iPhone, a Chrome OS-based tablet device or a similar device or application. It is understood that in other embodiments the devices described herein may be each characterized as being of one or more of the foregoing device types. Further, the embodiments described herein may be enabled using devices 103, 113, 115, 117 that are of the same type or that are of heterogeneous types.

Device A 103 is representative of one embodiment of one of the plurality of electronic devices 103, 113, 115, 117. Device A 103 comprises a software module 105, a display 107, an input device 109, a storage device 111 and a network interface 112. It is understood that in other embodiments the plurality of electronic devices 103, 113, 115, 117 may contain additional or fewer components than those depicted in FIG. 1.

Device A 103 communicates with other devices 113, 115, 117 over the network 101 using a network interface 112. The network interface 112 may connect to the network 101 using a wired or wireless connection and may utilize an Ethernet, TCP/IP, 802.11, cellular, bluetooth or other communication protocol. In some embodiments, devices on the network transmit reading location identifiers, annotations and/or other data to an intermediate service (for example, "the cloud") and the intermediate service determines which other devices should receive the data. The intermediate service can be configured to communicate such information to another device even when the transmitting device does not specify an intended recipient. In other embodiments, such data can be communicated directly between a transmitting device and a receiving device. The term "transmit" or "transmission," as used herein, generally refers to direct communications, indirect communications via an intermediate service and other communications methods capable of transmitting data.

The display 107 is configured to output to the user of Device A a reference document at a particular reading location and may additionally display one or more annotations that correspond to the reading location. Additional and alternative outputs to the display 107, like those associated with the embodiments described herein, are also contemplated.

The input device 109 may be used by the user of Device A 103 to select a reference document, navigate the reference document, select a reading location, enter an annotation, edit an annotation, select preferences for transmitting or receiving a reading location or an annotation, create a notes page, navigate a storefront of available documents, purchase and downloading documents, chat with other users and perform other functions. In one embodiment, the input device 109 is a touch-sensitive display 107 configured to receive single or multi-touch inputs from the user. In other embodiments, the input device 109 may alternatively or additionally be a full-size physical keyboard, a mouse, a QWERTY keypad, an alphanumeric keypad found on a telephone, a microphone for receiving audible commands or other device capable of receiving input from a user.

The storage device 111 may be a local or remote storage device and may be a hard disk, optical media, a magnetic storage device, a solid state drive, memory chip or other storage medium. The storage device 111 is capable of storing a copy of the reference document, reading locations, annotations and/or the software module 105.

In some embodiments, the storage device 111 stores a persistent copy of the reference document. A persistent copy of the reference document can be accessed when the device storing the copy is not connected to the network. For example, persistent copy, as used herein, is not intended to refer to a copy of a document (or a substantial portion thereof) that must downloaded from the Internet each time the document is accessed.

In one embodiment, the software module 105 is configured to generate and/or interpret the computer-readable location identifier. As used herein, the word module refers to logic embodied in hardware or firmware, or to a collection of software instructions, possibly having entry and exit points, written in a programming language, such as, for example, C, C++, Java, JavaScript, Flash, Silverlight, HTML, Objective-C, Objective-J or LISP. A software module may be compiled and linked into an executable program, installed in a dynamic link library, or may be written in an interpreted programming language such as, for example, BASIC, Perl, Python, JavaScript or Ruby. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

Figure 2:
FIG. 2 illustrates one embodiment of the architecture of an electronic device of the present invention.

FIG. 2 illustrates one embodiment of the architecture of an electronic device of the present invention. In FIG. 2, the architecture 200 of the electronic device comprises multiple layers, including the hardware device and operating system 201, the client application 203, a digital rights management (DRM) layer 205, a media bundle 211, an interactivity metalanguage 207, an interactive engine 209, a layout/rendering engine 215, a platform-specific API 213 and a user interface 217. In some embodiments, the client application 203 includes some or all of layers 205, 207, 209, 211, 213, 215 and 217.

In one embodiment, the hardware device and operating system 201 provide the functions required to run application software, including the processor, system memory, storage, network interface, TCP/IP stack or other protocol stack, and application programming interfaces for the development of software applications. The hardware device and operating system can be of any variation, including traditional PC-based operating systems, mobile device operating systems or network-based operating systems that abstract the hardware layer from the application programming interface. The client application 203 represents the user-level executable the user launches on the client device in order to access the features of the platform as illustrated in this figure. In some embodiments, all functions of the layers shown in this diagram 200, with the exception of the hardware and operating system 201, are encapsulated in the client application. In one implementation, Digital Rights Management, or DRM, 205 provides data protection to inhibit a user's ability to extract media bundles 211, content written in the intermediate metalanguage 207, and/or other protected assets from the application software. The DRM 205 can also be configured to prevent a user or system from extracting text, images, video or other protected assets, and transmitting those assets to another device or writing them out to disk for later retrieval or sharing. The DRM 205 may also monitor file system and memory activity to ensure that protected content is not left in a cache or other persistent, unprotected form. The intermediate metalanguage 207 preferably provides a platform-agnostic representation of all content and metadata for that content. Metadata can include basic information such as the date content was created, the version number, and where that content should appear in the context of its bundle. Metadata may also include descriptions of interactive behavior, such as, for example, where audio annotations would be anchored on an image when it is rendered in the system, or how a molecular stick figure might be positioned initially on-screen when the user opens it. Preferably, the intermediate metalanguage 207 is consistent across multiple hardware devices and operating systems 201. The interactive engine 209 is configured to interpret the intermediate metalanguage 207 and read data from the media bundle 211, providing it in a platform-specific representation to the layout/rendering engine 215 and the platform-specific API 213. The interactive engine can be configured to also handle events such as multi-finger touch inputs to determine the appropriate behavior of the object on screen. The platform-specific API 213 is configured to accept data from the interactive engine 209 and media bundle 211 and determine the appropriate objects to instantiate in order to display the content to the user. The layout/rendering engine 215 works in parallel with the platform-specific API 213 to render that content to the display. The user interface 217 is a collection of canonical visual elements that provide the user with known results to input behaviors. For example, the user interface can be configured to render a small "sticky note" that shows that a given location in the document has an annotation attached.

III. Location Identifier

Figure 3:
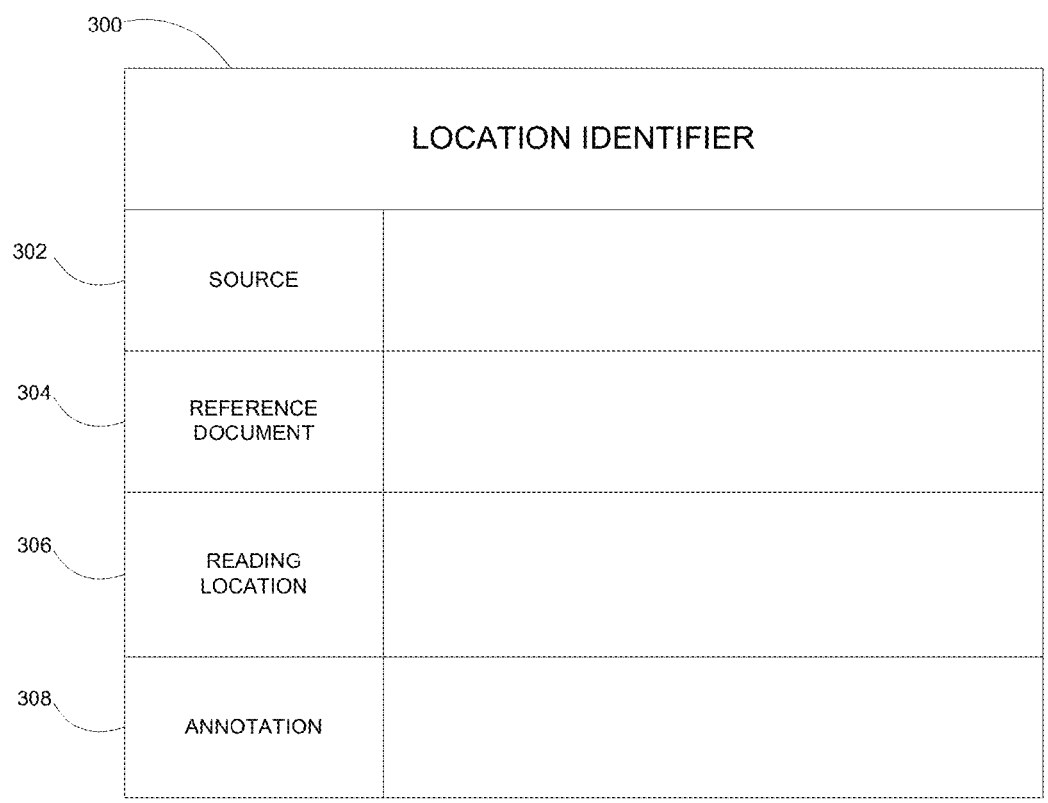
FIG. 3 illustrates one embodiment of a location identifier.

FIG. 3 illustrates one embodiment of a location identifier 300. In FIG. 3, the location identifier 300 is a computer-readable data structure comprising a plurality of fields that include information about a particular reading location selected by a user of an electronic computing device. For example, fields in a location identifier data structure 300 include a source field 302, a reference document field 304, a reading location field 306 and an annotation field 308.

The source field 302 stores a value corresponding to the identity of the electronic device that generates the location identifier 300. For example, the value can represent the identity of the user of the electronic device and/or the MAC address of the electronic device that created the location identifier. Additionally or alternatively, the source field 302 may include a value corresponding to the identity of the electronic device that is currently transmitting or has in the past transmitted the location identifier.

The reference document field 304 stores a value corresponding to the identity of a reference document. The reference document field 304 may store any value that one or more electronic devices connected to the network can recognize as referring to the reference document. For example, the value stored in the reference document field 304 can be the title of the reference document, an International Standard Book Number (ISBN), a universal resource locator (URL) address, an output of a hash function, a universally unique identifier (UUID) or a pointer to a shared resource. In some implementations, the reference document field 304 may additionally include a value corresponding to a particular version of the reference document.

The reading location field 306 stores a value corresponding to a reading location located within the reference document 304. The reading location field may include a pointer to an object, such as a block of text, an image, a movie file, a 3-D object or other such media object, and an offset, such as a number of characters, frames, or pixels from the start of the file, or any other value which one or more electronic devices with rights to use the reference document 304 can recognize as the specified reading location, regardless of how that content is displayed to a user on that particular device. It is understood that the location identifier 300 may be configured to store one or more reading locations.

In some embodiments, the location identifier 300 comprises an annotation field 308. The annotation field comprises a user-generated or computer-generated value with contextual relevance to the reading location referenced in the reading location field 306. In other embodiments in which an annotation is not specified or is irrelevant to a particular application, the annotation field 308 contains a null set or the annotation field 308 is omitted from the location identifier 300.

It is recognized that in other embodiments, the location identifier 300 may include only some of the fields illustrated in FIG. 3 or may include additional fields. In addition, the values stored in the fields of the embodiments described above may be stored in a single field or stored in parts in a plurality of fields. It is further recognized that the data stored in the location identifier may be communicated using a single data structure or a plurality of data structures.

IV. Transmit Reading Location

Figure 4:
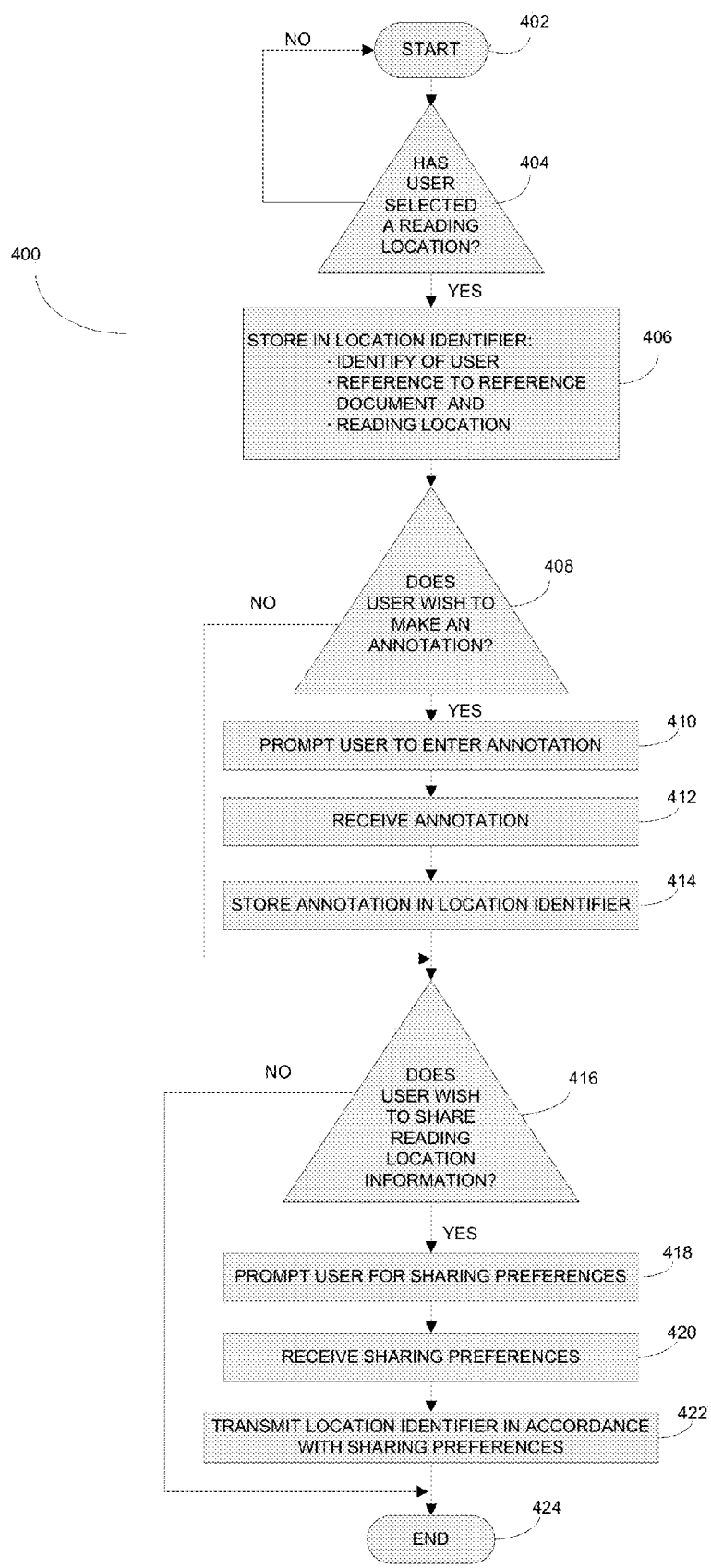
FIG. 4 illustrates one embodiment of a flowchart of operations for transmitting reading location information and a corresponding annotation to another device on a network.

FIG. 4 illustrates one embodiment of a flowchart of operations for transmitting reading location information and a corresponding annotation to another device on a network. The transmission operation 400 begins 402 by determining whether the user of a particular electronic computing device has selected a reading location 404. If the user has not selected a particular reading location 404, the process starts 402 again waiting for the user to select a particular reading location. However, if the user has selected a reading location 404, the electronic computing device creates a location identifier (if one has not already been created) and stores in the location identifier: (a) source information identifying the user of the electronic computing device and/or the electronic computing device, (b) a reference identifying the reference document and (c) a reference identifying a reading location within the reference document 406.

In decision block 408, the operation 400 device determines whether the user wishes to create an annotation associated with the reading location. If the user does not wish to create an annotation, the process skips to decision block 416. However, if the user wishes to make an annotation, the user is prompted to enter an annotation 410. The annotation is then received by the electronic computing device 412 and stored in the location identifier 414.

In decision block 416, the operation 400 determines whether the user wishes to share the reading location information with other users. If the user does not wish to share the reading location information with other users, the operation 400 ends 424. However, if the user wishes to share the reading location information with other users, operation 400 prompts the user to input the user's sharing preferences 418, receives the sharing preferences 420 and transmits the location identifier to other electronic devices in accordance with the user's sharing preferences 422. The operation 400 may be configured to transmit the reading location information to other electronic devices without transmitting a copy of the reference document.

In one embodiment, the user enters preset sharing preferences that are globally applied to sharing performed by the user. In another embodiment, preset sharing preferences are applied if certain conditions are satisfied (for example, a user may specify preset sharing preferences for a particular reference document). In the foregoing embodiments, operation 400 may be modified to provide the user with the option to override the preset sharing preferences. For example, sharing preferences may include granting permission to share with anybody or to share with only a particular group of one or more users or a particular class of users. Sharing preferences may also include restricting sharing to a particular group of one or more users or a particular class of users or permitting sharing to anyone who wish.

It will be appreciated by one with skill in the art that operation 400 is not limited to the sequence of steps depicted in FIG. 4. In other embodiments, the inputs and outputs of operation 400 are passed as values, references and/or stored in accessible memory locations. It is also recognized that the copy of the reference document and/or the reading location information may be stored locally or remotely (for example, on a server).

V. Receive Reading Location

Figure 5:
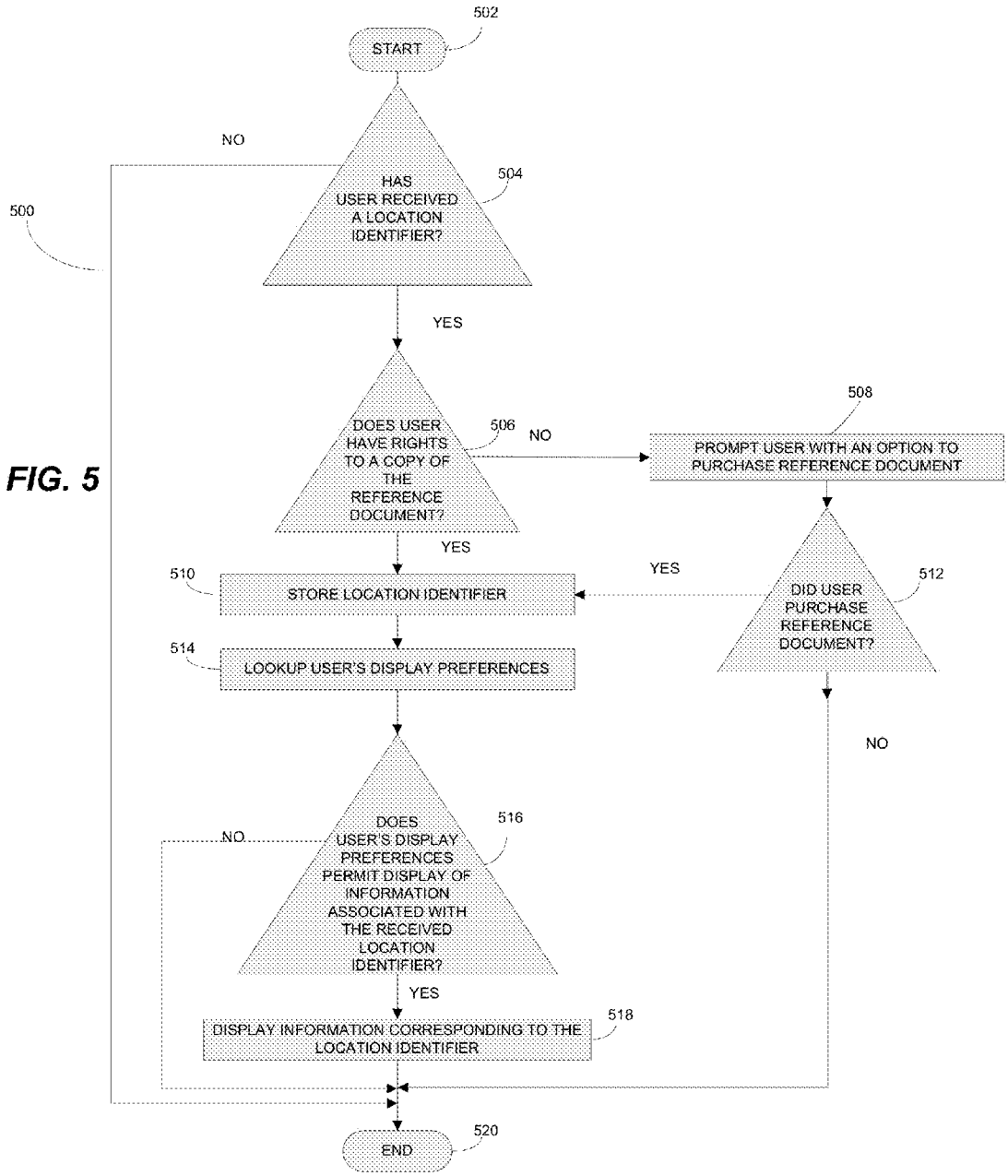
FIG. 5 illustrates one embodiment of a flowchart of operations for receiving reading location information and a corresponding annotation from another device on a network.

FIG. 5 illustrates one embodiment of a flowchart of operations for receiving reading location information and a corresponding annotation at an electronic computing device from another device on a network. The receiving operation 500 begins 502 with decision block 504 which determines whether a user has received a location identifier. If the user has not received a location identifier, operation 500 ends 520. However, if the electronic computing device has received a location identifier, the operation proceeds to decision block 506.

Decision block 506 determines if the user has rights to use a copy of the reference document referenced by the received location identifier. The operation 500 makes the determination by analyzing the DRM information associated with the copy of the reference document. In another embodiment, the operation 500 queries a remote database to determine whether the user has rights to use a copy of the reference document.

If the user does not have rights to use a copy of the reference document 506, the user is prompted with an option to purchase rights to use a copy of the reference document 508. If the user does not purchase rights to use a copy of the reference document 512, the operation 500 ends 520.

If the user has rights to use a copy of the reference document (either by having a preexisting right to use it 506 or by purchasing rights to use it 512), the electronic computing device stores the received location identifier 510 and performs a lookup of the user's display preferences 514. Decision block 516 determines whether the user's display preferences permit the electronic computing device to display information associated with the received location identifier.

In one embodiment, the user can specify display preferences that allow for the display of information associated with a location identifier if the location identifier is received from a group of one or more specified users or one or more classes of users. In another embodiment, the user can specify display preferences that do not allow the display of information associated with a location identifier if the location identifier is received from a group of one or more specified users or one or more classes of users. For example, a class of users may comprise members of a social-network (for example, Facebook® friends of the receiving user), members of a group that the receiving user has elected to "follow" (for example, Twitter® users that a user is following), students enrolled in an educational course, employees of an organization, members of a book club, all owners of a given document within a certain radius of a given location, all users interested in the main subject of the document (e.g., "patent law" or "personal finance") and members of a working group.

If the user's display preferences permit display in decision block 516, the receiving electronic computing device outputs information corresponding to and/or associated with the received location identifier to its display. Embodiments for displaying information associated with the received location identifier will be described in more detail below. However, if the display preferences do not permit display, the process 500 ends.

It will be appreciated by one with skill in the art that operation 500 is not limited to the sequence of steps depicted in FIG. 5. In other embodiments, the inputs and outputs of operation 500 are passed as values, references and/or stored in accessible memory locations. It is also recognized that the copy of the reference document and/or the reading location information may be stored locally or remotely (for example, on a server).

VI. Display Options

The embodiments described in this section refer to a "receiving electronic device" which is an electronic device that has received one or more location identifiers. In one embodiment, the receiving electronic device receives a location identifier and is configured to display a copy of the reference document at or near the reading location stored in the location identifier. In another embodiment, the receiving electronic device receives a plurality of location identifiers. The receiving electronic device can be configured to display indications in the display of the reference document that correspond to the reading locations associated with each of the plurality of location identifiers. In yet another embodiment, the receiving electronic device is configured to permit a user to navigate to reading locations specified by a plurality of received location identifiers using an input device. For example, the receiving electronic device can be configured to permit the user to navigate to successive reading locations and/or jump to a reading location using a map or other index of reading locations associated with the reference document.

In another embodiment, the receiving electronic device receives a plurality of location identifiers and is configured to display a notes page. A notes page comprises excerpts of one or more reference documents located at or near the reading locations specified by the plurality of the location identifiers and/or annotations stored in the location identifiers. In some implementations, a user can navigate to a reading location associated with an entry in the notes page by selecting the entry using an input device associated with the receiving electronic device.

In a further embodiment, the receiving electronic device displays a "heat map" in connection with the display of the reference document. In one implementation, the heat map uses colors to represent the concentration of reading locations located within the reference document. The reading locations may be specified by the user of the receiving electronic device and/or other users with rights to use a copy of the reference document. For example, the most commonly highlighted and/or commented text can be indicated using the color red at or near the text. Text that is less frequently highlighted and/or commented can be indicated using other colors, such as yellow and green, that are representative of the respective frequency with which text is highlighted and/or commented.

In yet another embodiment, the receiving electronic device updates a display of a copy of the reference document in response to receiving a location identifier. In one implementation, the display of the receiving electronic device is updated with icons displayed in connection with the reference document, each associated with a received location identifier, as such location identifiers are received. In another implementation, the display of the of the receiving electronic device is updated with icons in the reference document without refreshing unchanged portions of the display. In yet another implementation, the display of the receiving electronic device is updated with icons in real-time.

VII. Exemplary Applications

Figure 6B:
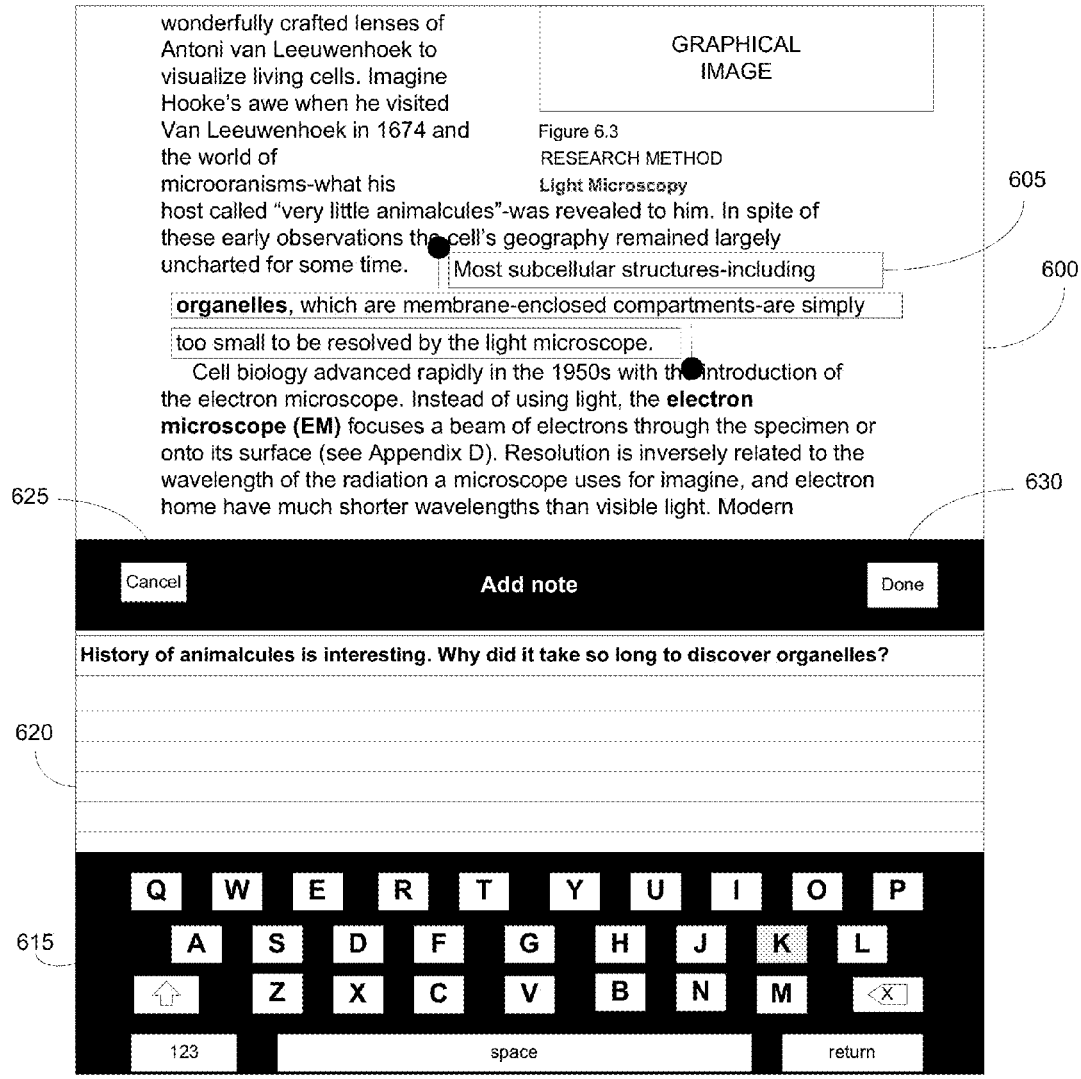

FIGS. 6A-E illustrate an example application of an embodiment of the invention for use by a student in an educational course. FIG. 6A depicts a display 600 of an electronic device showing a portion of a reference document comprising formatted text and figures. The user has selected certain portions of the text 610 in order to specify a reading location. Options for the text comprising the reading location appear in menu 605 and include: "Copy," "Highlight" and "Add note." Further options, such as, for example, "Cut," "Paste" and "Share" may additionally or alternatively appear in menu 605.

FIG. 6B depicts the display 600 after the user has selected "Add note" from the menu 605. The display now shows an "Add note" region 620 comprising buttons labeled "Done" 630 and "Cancel" 625 and a text input region 615 which, in the depicted embodiment, is a touch-sensitive keyboard. The user can enter an annotation using the text input region 615. As the annotation is entered, it appears in the "Add Note" region 620. At any time, the user can decide to delete the annotation by selecting the "Cancel" button 625 or add the annotation to the reference document by selecting the "Done" button 630. FIG. 6C depicts the display 600 after an annotation has been added to the reference document. An icon 635 representing the annotation is added to the display 600 near the reading location associated with the annotation. As shown in FIG. 6D, when the user selects the icon 635 (for example, by touching it using a touch-sensitive display or by hovering a pointer over it using a mouse), the display 600 displays the annotation 640. After creating an annotation, a user may optionally select the icon 635 for editing which causes the "Edit note" region to appear 645 on the display 600, as shown in FIG. 6E.

In other embodiments, a user may also specify a reading location by selecting "Highlight" from the menu 605 or by pressing the "Done" button 630 after having entered nothing in the "Add Note" region 620.

Figure 7B:
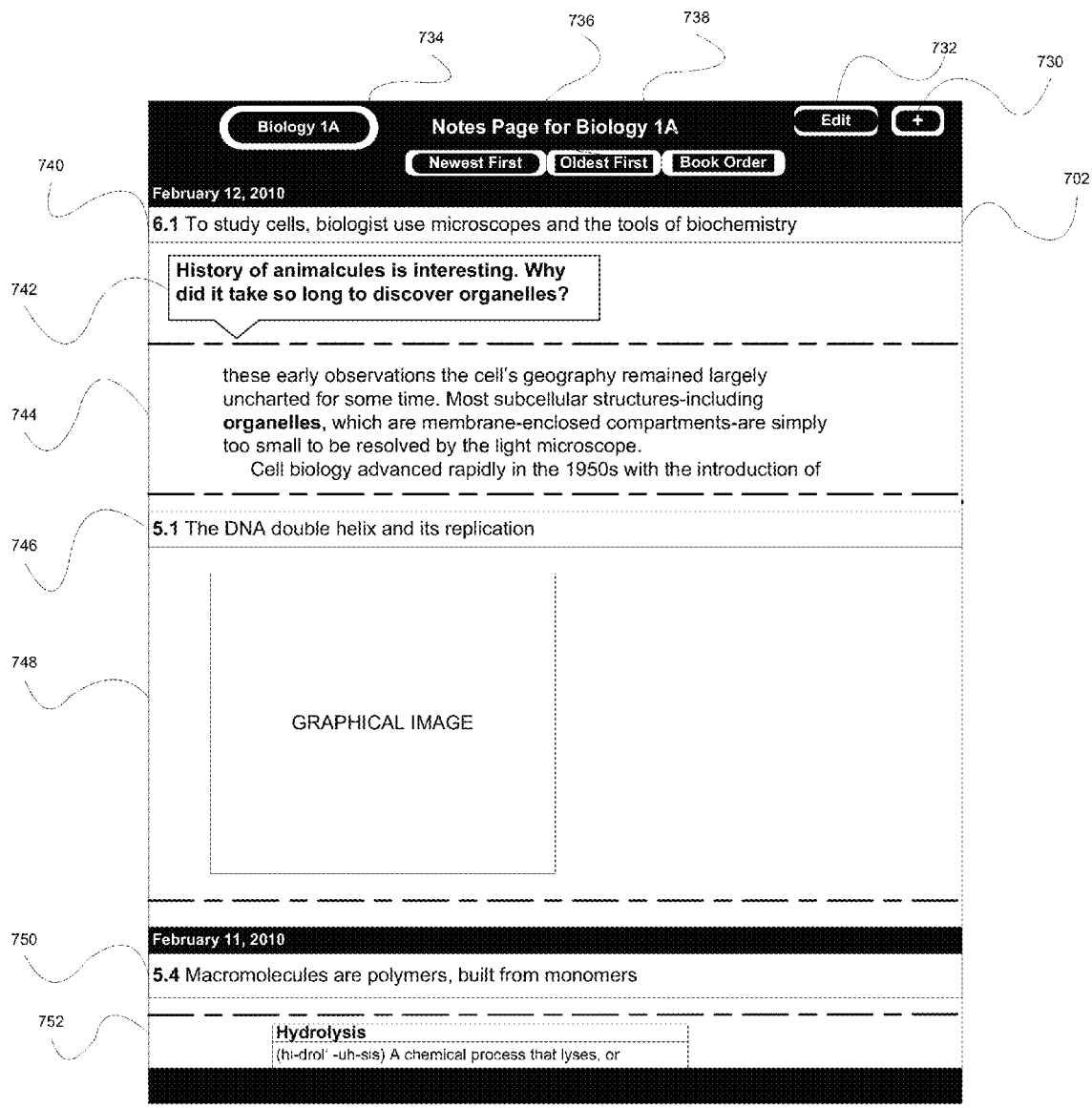
Figure 7C:
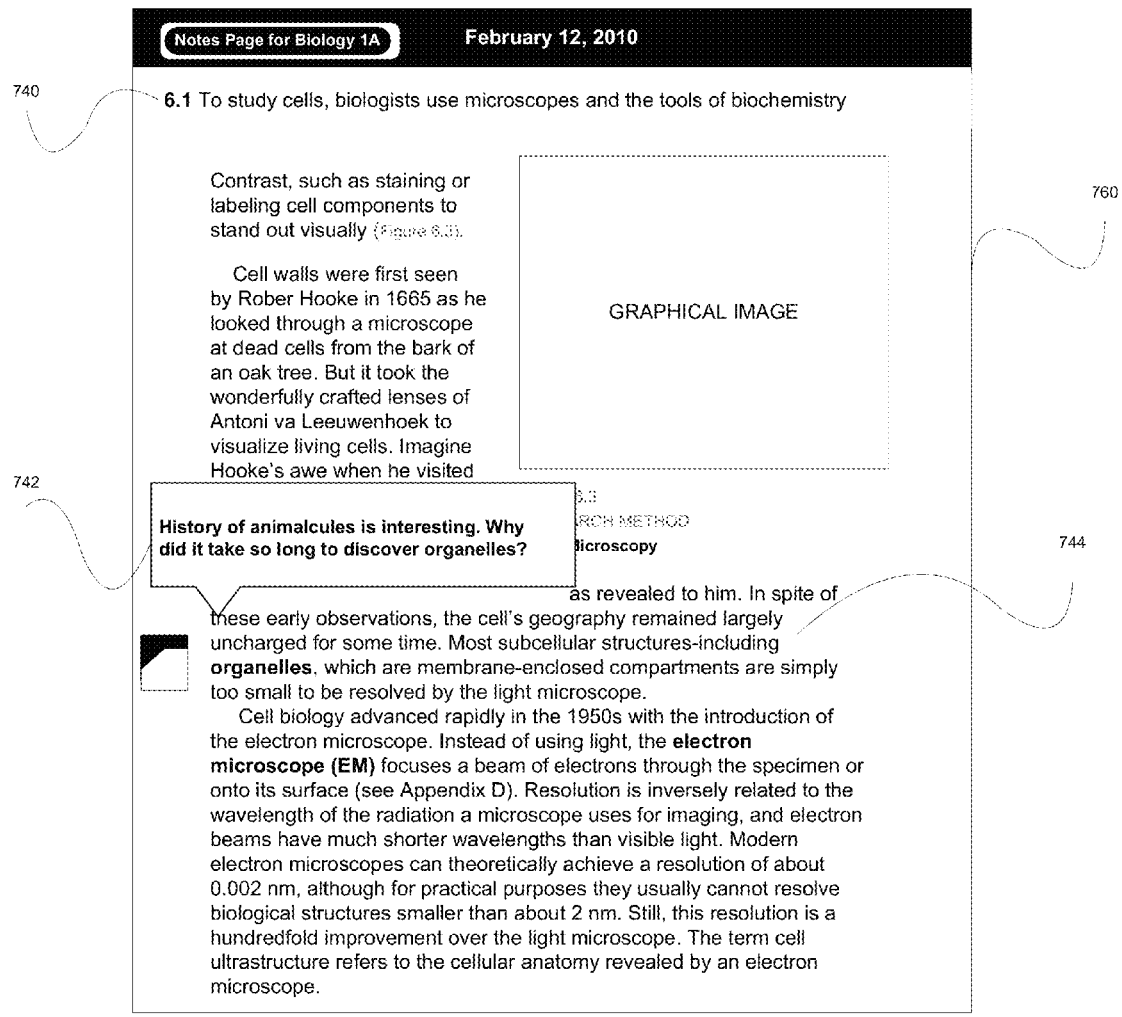

FIGS. 7A-C illustrate another example application of an embodiment of the invention for use by a student in an educational course. FIG. 7A illustrates a high-level diagram depicting navigation between a notes page 702 and various locations in a reference document 712, 716, 718. The display 702 shows a notes page containing plurality of entries 704, 706, 708, each corresponding to a different reading location 712, 716, 718 within the reference document. Entry 704 corresponds to a reading location 712 that comprises a paragraph of text; entry 706 corresponds to a reading location 716 that comprises a graphical image; and entry 708 corresponds to a reading location 718 that comprises a page of text. When a user selects any one of the entries 704, 706, 708, the display 702 changes to display the portion of the reference document that includes the reading location associated with the selected entry 710, 714, 718.

FIG. 7B illustrates one embodiment of the notes page 702. The notes page comprises various entries that each comprise a section heading associated with the reading location of the entry 740, 746, 750, an annotation associated with the reading location (if one has been entered by the user) 742 and excerpts of the reference document that include some or all of the associated reading location 744, 748, 752. When a user selects reading location 744, the display 702 is changed to display 760 which is depicted in FIG. 7C. Display 760 includes the heading 740, annotation 742 and reading location 744 associated with the first entry in notes page 702. Selection by a user of other entries in the notes page will change the display to show portions of the reference document that correspond to the reading location associated with the entry.

VIII. Other Embodiments

While certain embodiments of the invention have been described, these embodiments have been presented by way of example only, and are not intended to limit the scope of the present invention. Accordingly, the breadth and scope of the present invention should be defined in accordance with the following claims and their equivalents.

By way of example, the following alternatives are also contemplated. In the case where a user of the invention has the latest version of a document (for example, version 8.0) and another user also has that same version, the device accepts reading locations and annotations which are shared to the other user's device. If the second user downloads an update to his document (for example, version 8.1), the second device must now resolve reading locations against similar but not identical documents. The second device may be configured to resolve this ambiguous situation by generalizing the reading location to its nearest similar anchor, displaying the reading location and its associated annotation, if any, in the correct location if that content still exists, or at a similar location if that content has been modified. In cases where entire annotated sections are missing from the new document, the reading location can be defined to be the former relative location of the removed text (for example, in the gap between the preceding and proceeding paragraphs of a missing paragraph which was annotated originally). For example, the platform is capable of resolving modifications to the source document after annotations have been added, but without transmitting any portion of the source document to the receiving user.

It is recognized that many lecture-style classes at four-year universities have hundreds or even thousands of enrollees, all of whom must stay in sync with the progress of their class. In lecture halls, professors often reference handouts, textbooks or other documents in the course of discussion. Embodiments of the invention can be configured to allow the professor to distribute a reading location to immediately synchronize all devices in the room to a given reading location. For example, if the professor is referring to a specific concept in the reading, he may distribute a reading location that points to a relevant figure or illustration. Users may also annotate the figure with their own observations or those given verbally by the professor, and will instantly see the comments and annotations of others in the class as they contribute their own. Students who did not attend lecture can view the collection of comments or the indication of popularity of that figure when they next visit that reading location.

In another example, students who are collaborating on schoolwork are able to pass reading locations to one another using their devices. Provided that two students are using the same document, one student can pass to the other student a reading location (for example, via a chat window within the application) and the second student can then immediately jump to that location in the document, without passing a copy of the document over the network, and without regard for the specific version of the document that either student is using.

The above-mentioned alternatives are examples of other embodiments, and they do not limit the scope of the invention. It is recognized that the present invention may be implemented on a variety of processing platforms and that various fields, values and displays may be used. In addition, other embodiments of the flow charts may be used.

What is claimed is:

1. A digital computing device for viewing shared annotations of at least one electronic reference document, the device comprising a digital memory, a display, a user input interface, and a network interface; and said computing device being configured to:
    receive, over a network, via the network interface, a digital location identifier for navigation to a shared reading location with an associated annotation, said digital location identifier specifying the shared reading location within a version of the electronic reference document and does not include the version of the electronic reference document;
    upon receipt of a selection to navigate to the shared reading location, determine if a user of the digital computing device has sufficient rights to use a copy of the electronic reference document referenced by the digital location identifier, and, if the user does not have sufficient rights, (i) provide a prompt with an option for the user to purchase said rights, (ii) responsive to confirmation of the purchase of the rights to use the copy of the electronic reference document, receive the copy of the electronic reference document, and (iii) store the copy of the electronic reference document in the digital memory; and
    upon successful confirmation of the user's rights to use the copy of the electronic reference document and responsive to the selection to navigate to the shared reading location (i) determining that the content referenced by the digital location identifier exists in the copy of the reference document, (ii) displaying at least a portion of the copy of the electronic reference document at the shared reading location and the associated annotation within the copy of the electronic reference document at the shared reading location.

2. The computing device of claim 1, wherein the digital location identifier specifies the reading location by specifying one or more of: a letter, a word, a group of words, a title, a sentence, a paragraph, a chapter, a section, an image, a table, an interactive object, an assessment, and a page.

3. The computing device of claim 1, wherein the digital location identifier and the annotation are received from a second computing device connected to the network, wherein the device and the second device comprise heterogeneous computing platforms.

4. The computing device of claim 1, further configured to output to the display an additional annotation in real time, in response to receiving the additional annotation, without updating other portions of the display.

5. The computing device of claim 1, wherein the annotation comprises at least one of: one or more words, one or more numerals, a mathematical formula, a graphical image, a link to a location, a universal resource locator (URL) address, a script, and highlighting of selected text.

6. The computing device of claim 1, wherein upon successful confirmation of the user's rights to use the copy of the electronic reference document, the display of the electronic computing device displays a plurality of annotations received from one or more other electronic devices, each associated with a corresponding reading location within the reference document.

7. The computing device of claim 6, wherein the reading locations of at least two of the plurality of annotations identify locations within two different portions of the electronic reference document, the two different portions being non-contiguous, and wherein the computing device is further configured to output to the display a notes page comprising the at least two of the plurality of annotations.

8. The computing device of claim 7, wherein the device is further configured to output to the display the portion of the electronic reference document identified by selection of one of the plurality of annotations.

9. The computing device of claim 6, further configured to output to the display a heat-map indicating a concentration of the plurality of annotations at each of one or more respective locations within the electronic reference document.

10. The computing device of claim 1, further configured to: receive, via the user input interface, the copy of the electronic reference document and to store the copy in the digital memory responsive to confirmation of the purchase of the rights to use the copy of the electronic reference document by the user.

11. The computing device of claim 1, wherein the computing device is configured to display the copy of the electronic reference document, with the annotation automatically shown at a nearest similar location on the display responsive to determining that the content referenced by the digital location identifier does not exist in the copy of the electronic reference document.

12. The computing device of claim 11, wherein the nearest similar location is determined to be a location which is a nearest similar anchor.

13. A non-transitory machine readable storage device tangibly storing a program of machine-readable instructions executable by a computer-based machine, which instructions, when performed by the computer-based machine, cause the computer-based machine to perform operations comprising:
receiving, over a network, via a network interface, a digital location identifier for navigation to a shared reading location with an associated annotation, said digital location identifier specifying the shared reading location within a version of the electronic reference document and does not include the version of the electronic reference document;
upon receipt of a selection to navigate to the shared reading location, determining if a user has sufficient rights to use a copy of the electronic reference document referenced by the digital location identifier, and, if the user does not have sufficient rights, (i) providing a prompt with an option for the user to purchase said rights, (ii) responsive to confirmation of the purchase of the rights to use the copy of the electronic reference document, receiving the copy of the electronic reference document, and (iii) storing the copy of the electronic reference document in the digital memory; and
upon successful confirmation of the user's rights to use the copy of the electronic reference document and responsive to the selection to navigate to the shared reading location (i) determining that the content referenced by the digital location identifier exists in the copy of the reference document, (ii) displaying at least a portion of the copy of the electronic reference document at the shared reading location and the associated annotation within the copy of the electronic reference document at the shared reading location.

14. The non-transitory machine-readable storage device of claim 13, wherein the digital location identifier specifies the reading location by specifying one or more of: a letter, a word, a group of words, a title, a sentence, a paragraph, a chapter, a section, an image, a table, an interactive object, an assessment, and a page.

15. The non-transitory machine-readable storage device of claim 13, wherein the instructions further comprise instructions, which when performed by the machine, cause the machine to perform the operations comprising: outputting to the display an additional annotation in real time, in response to receiving the additional annotation, without updating other portions of the display.

16. The non-transitory machine-readable storage device of claim 13, wherein the annotation comprises at least one of: one or more words, one or more numerals, a mathematical formula, a graphical image, a link to a location, a universal resource locator (URL) address, a script, and highlighting of selected text.

17. The non-transitory machine-readable storage device of claim 13, wherein the instructions further comprise instructions, which when performed by the machine, cause the machine to perform the operations comprising: displaying a plurality of annotations received from one or more electronic devices, each associated with a corresponding reading location within the electronic reference document.

18. The non-transitory machine-readable storage device of claim 17, wherein the reading locations of at least two of the plurality of annotations identify locations within two different portions of the electronic reference document, the two different portions being non-contiguous, and wherein the instructions further comprise instructions, which when performed by the machine, cause the machine to perform the operations comprising: outputting to the display a notes page comprising the at least two of the plurality of annotations.

19. The non-transitory machine-readable storage device of claim 18, wherein the instructions further comprise instructions, which when performed by the machine, cause the machine to perform the operations of: responsive to a selection of one of the plurality of annotations, outputting to the display the portion of the electronic reference document identified by the selected annotation.

20. The non-transitory machine-readable storage device of claim 17, wherein the instructions further comprise instructions, which when performed by the machine, cause the machine to perform the operations comprising: outputting to the display a heat-map indicating a concentration of the plurality of annotations at each of one or more respective locations within the electronic reference document.

* * * * *